United States Patent [19]
Miura et al.

[11] Patent Number: 5,849,391
[45] Date of Patent: Dec. 15, 1998

[54] CORDIERITE HONEYCOMB STRUCTURE AND PROCESS FOR PRODUCING THE SAME

[75] Inventors: Yasunao Miura, Nagoya; Kojiro Tokuda, Kariya; Mamoru Nisimura, Nagoya, all of Japan

[73] Assignee: Nippondenco Co., Ltd., Japan

[21] Appl. No.: 519,285

[22] Filed: Aug. 25, 1995

[30] Foreign Application Priority Data

Aug. 26, 1994 [JP] Japan ................................. 6-225652

[51] Int. Cl.$^6$ ........................................... B32B 3/12
[52] U.S. Cl. ............................................ 428/116; 428/702
[58] Field of Search .................................. 428/116, 702; 156/631

[56] References Cited

U.S. PATENT DOCUMENTS

| | | | |
|---|---|---|---|
| 3,885,977 | 5/1975 | Lachman | 428/116 |
| 3,954,672 | 5/1976 | Somers | 428/116 |
| 4,280,845 | 7/1981 | Matsuhisa | 428/116 |
| 4,295,892 | 10/1981 | Matsuhisa | 428/116 |
| 4,327,188 | 4/1982 | Endo | 428/116 |
| 4,657,880 | 4/1987 | Lachman | 428/116 |
| 4,849,275 | 7/1989 | Hamaguchi | 428/116 |
| 4,869,944 | 9/1989 | Harada | 428/116 |
| 5,545,243 | 8/1996 | Kotani | 428/116 |

FOREIGN PATENT DOCUMENTS

| | | |
|---|---|---|
| 61-17469 | 1/1986 | Japan . |
| 2-293375 | 12/1990 | Japan . |
| 4-305076 | 10/1992 | Japan . |
| 5-82343 | 11/1993 | Japan . |

*Primary Examiner*—Timothy M. Speer
*Attorney, Agent, or Firm*—Cushman Darby & Cushman Intellectual Property Group of Pillsbury Madison & Sutro, LLP

[57] ABSTRACT

A cordierite honeycomb structure having a coefficient of thermal conductivity of not less than 0.035 J/cm·°K.·sec, a porosity of not more than 16%, and a coefficient of thermal expansion of not more than $1.0\times10^{-6}$/°C. at 40° to 800° C. A process for producing a cordierite honeycomb structures, involves at least the steps of: mixing powders of kaolin, talc, and other starting materials for cordierite together so as to provide a chemical composition of cordierite; and extruding the mixture; and firing the extrudate, wherein the kaolin has an average particle diameter of not more than 5 $\mu$m and such a particle size distribution that the proportion of particles with diameters of less than 1 $\mu$m is 10% by weight and the talc has an average particle diameter of not more than 10 $\mu$m and such a particle size distribution that the proportion of particles with diameters of less than 1 $\mu$m is not more than 5%.

6 Claims, 7 Drawing Sheets

CORDIERITE HONEYCOMB STRUCTURE AND PROCESS FOR PRODUCING THE SAME

BACKGROUND OF THE INVENTION

1. Field of the Invention

The present invention relates to a cordierite honeycomb structure and more particularly to a cordierite honeycomb structure used as a catalyst carrier of converters for the purification of exhaust gases and a process for producing the same.

2. Description of Related Art

At the present time, in converters for the purification of exhaust gases discharged from automobiles and the like, cordierite honeycomb structures are used as a carrier on which a catalyst is supported.

In recent years, the demand for the purification of exhaust gases discharged from automobiles and the like has become strong. In order to meet this demand, an improvement in conversion efficiency through rapid activation of the catalyst has been required of the converters.

For this reason, an attempt to activate the catalyst supported on the carrier as quick as possible has hitherto been made in order to improve the conversion efficiency.

Initial conversion efficiencies in a transient state in addition to conversion efficiencies in a steady state are very important to the early activation of the catalyst in the converters, for the purification of an exhaust gas, used in automobiles. For example, the early activation of the catalyst which minimizes the time taken for the conversion efficiencies of the catalyst to reach the contemplated ordinary level is related to an improvement in the overall conversion efficiencies.

For this reason, various proposals have been made on the rapid activation of the catalyst.

For example, in Japanese Examined Patent Publication (Kokoku) No. 4-37028, in order to realize rapid activation of the catalyst by exposing a catalyst carrier to an exhaust gas at a high temperature in such a manner that the catalyst carrier is disposed in the vicinity of the engine, a honeycomb structure of cordierite having a coefficient of thermal expansion attributable to a porosity of not more than 30% has been proposed to improve the thermal shock resistance of the catalyst carrier to such an extent that the carrier per se causes neither cracking nor other unfavorable phenomena upon rapid temperature rise of the carrier per se.

Further, regarding the thermal shock resistance, Japanese Examined Patent Publication (Kokoku) No. 2-12898 proposes a cordierite honeycomb structure having a pore diameter and a pore volume attributable to a porosity of less than 25%.

As described above, in the rapid activation of the catalyst in the prior art, cordierite ceramic bodies have been studied with the focus placed on the thermal shock resistance, and no satisfactory rapid activation of the catalyst have been achieved yet.

Accordingly, an object of the present invention is to provide a cordierite honeycomb structure which can realize satisfactory rapid activation of a catalyst and a process for producing the same.

DESCRIPTION OF THE INVENTION

At the outset, the present inventors have studied the rapid activation of the catalyst.

Specifically, the catalytic conversion efficiencies generally increase with rises in temperature. Therefore, the shorter the time taken for the temperature of the catalyst to be raised, the better the initial conversion efficiencies. This means that the rapid activation of the catalyst can be attained by shortening the time taken for the temperature of the carrier per se to be raised.

Thus, the present inventors have noticed for the first time that the adoption of a constitution which can accelerate the rate of temperature rise of the carrier per se, specifically increasing the coefficient of thermal conductivity of the carrier per se, results in accelerated rate of temperature rise of the catalyst and improved initial conversion efficiencies.

Since realizing this, the present inventors have made studies on the following methods for improving the coefficient of the thermal conductivity of the carrier per se.

(1) Adding a metallic filler within the cordierite honeycomb structure.

(2) Using ceramics having a high coefficient of thermal conductivity, for example, SiC and SN, as the ceramic constituting the cordierite honeycomb structure.

(3) Regulating the porosity or other parameters of the cordierite honeycomb structure.

As a result, the following facts were found.

For the method (1), the metallic filler per se is unfavorably oxidized during firing of the ceramic, making it impossible for the carrier to exhibit, in an early stage after initiation of exposure to heat, high thermal conductivity inherent in the metallic filler.

For the method (2), here again, the high coefficient of thermal conductivity is deteriorated by firing, making it impossible for the carrier to exhibit high thermal conductivity in an early stage after initiation of exposure to heat. The present inventors have for the first time centered on the porosity of the carrier and succeeded in increasing the coefficient of thermal conductivity of the carrier per se.

Thus, according to the present invention, there is provided a cordierite honeycomb structure, composed mainly a crystalline phase of cordierite, having a coefficient of thermal conductivity of not less than 0.035 J/cm·°K·sec and a coefficient of thermal expansion of not more than $1.0 \times 10^{-6}$/°C. at 40° to 800° C.

The reason why in the present invention the coefficient of thermal conductivity is limited to not less than 0.035 J/cm·°K·sec will now be described.

Figure 1:
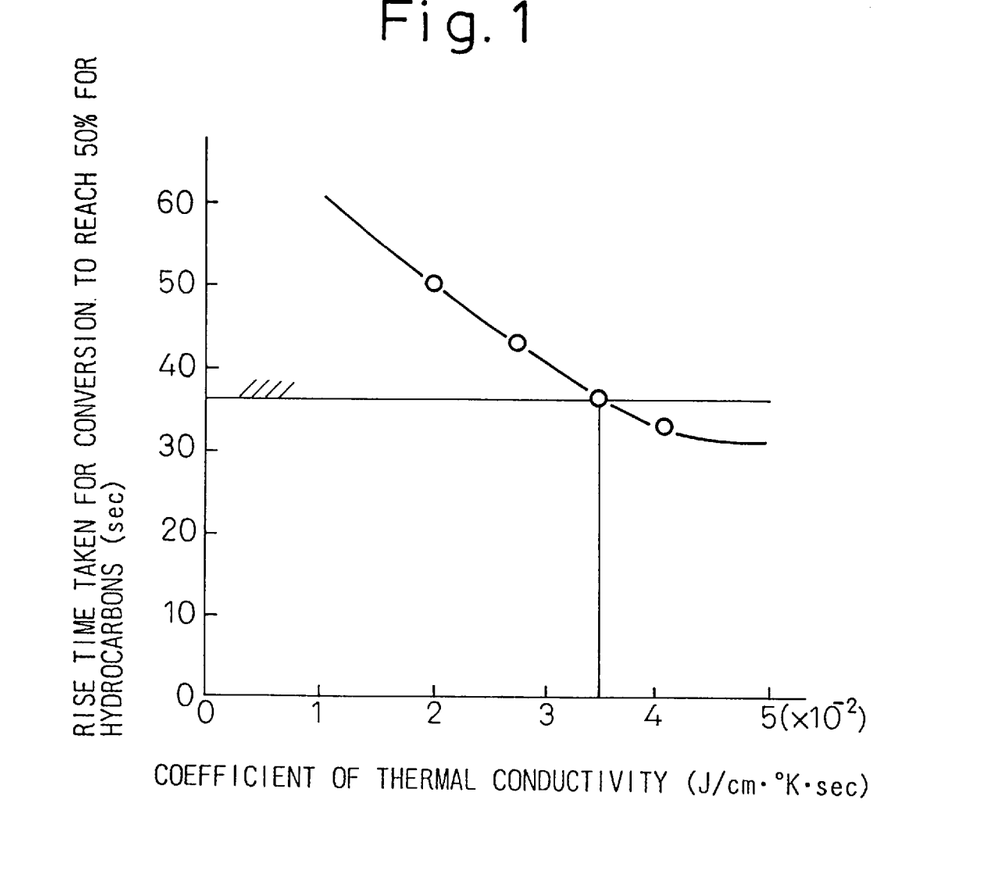
FIG. 1 is a diagram showing the relationship between the coefficient of thermal conductivity of the converter for purifying an exhaust gas according to the present invention and the rise time taken for the conversion efficiency to reach 50%.

FIG. 1 is a diagram showing the relationship between the coefficient of thermal conductivity and the rise time taken for the conversion efficiency to reach 50%.

As is apparent from FIG. 1, when the coefficient of thermal conductivity is less than 0.035 J/cm·°K·sec, the rise time taken for the conversion efficiency to reach 50% decreases in proportion to the coefficient of thermal conductivity. On the other hand, when the coefficient of thermal conductivity is not less than 0.035 J/cm·°K·sec, the rise time taken for the conversion efficiency to reach 50% becomes almost constant. Thus, when the coefficient of thermal conductivity is not less than 0.035 J/cm·°K·sec, the rise time taken for the conversion efficiency to reach 50% from the initiation of activation of the catalyst in the purification of an exhaust gas can be sufficiently shortened, enabling the early activation of the catalyst to be attained. This shows a clear superiority in conversion efficiency of the catalyst supported on the cordierite honeycomb structure having a coefficient of thermal conductivity of not less than 0.035 J/cm·°K·sec.

Figure 5:
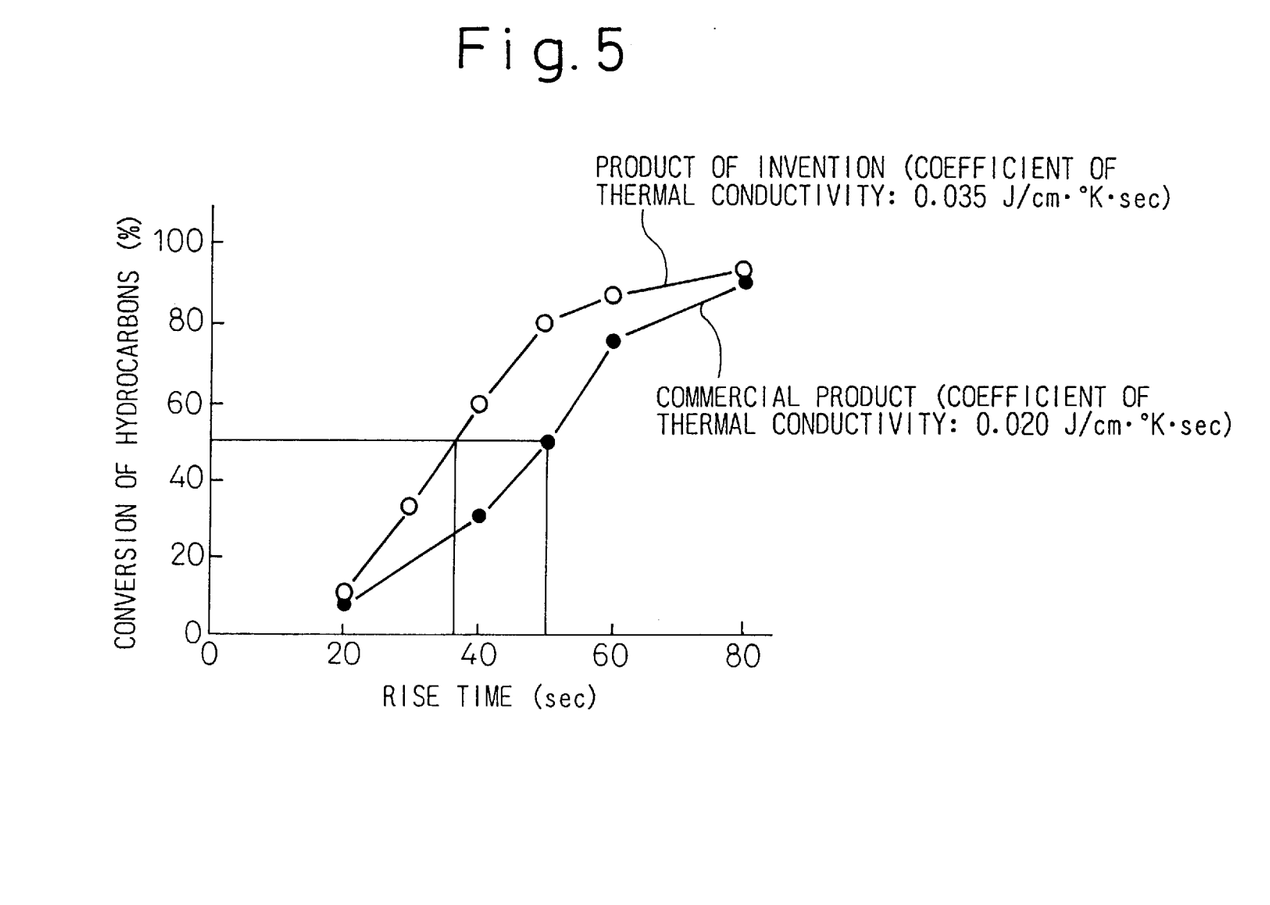
FIG. 5 is a diagram showing the rise time for the conversion efficiency of a converter, purifying an exhaust gas, using a cordierite honeycomb structure prepared in Example 2.

More specifically, when the carrier has a coefficient of thermal conductivity of not less than 0.035 J/cm·°K·sec, an improvement in initial catalytic conversion efficiency for purifying an exhaust gas over that of the conventional product having a coefficient of thermal conductivity of about 0.02 J/cm·°K.·sec can be attained (see FIG. 5).

The reason for this is believed to be as follows. Specifically, the relationship between the activity of the catalyst per se and the temperature is governed by the kind, amount, properties, and other factors of the catalyst, while for the activity of the catalyst supported on a carrier, the conduction of heat generated in a reaction between the catalyst and the exhaust gas, that is, the coefficient of thermal conductivity of the carrier, plays an important role.

Meanwhile, when the coefficient of thermal expansion at 40° to 800° C. exceeds $1.0\times10^{-6}/°C$., the thermal shock resistance is deteriorated. Therefore, the cordierite honeycomb structure having such a high coefficient of thermal expansion cannot be applied to a catalyst carrier in severe environments found in automobiles and the like. For this reason, a coefficient of thermal expansion at 40° to 800° C. of not more than $1.0\times10^{-6}/°C$. is indispensable to the use of the cordierite honeycomb structure as the catalyst carrier.

Figure 2:
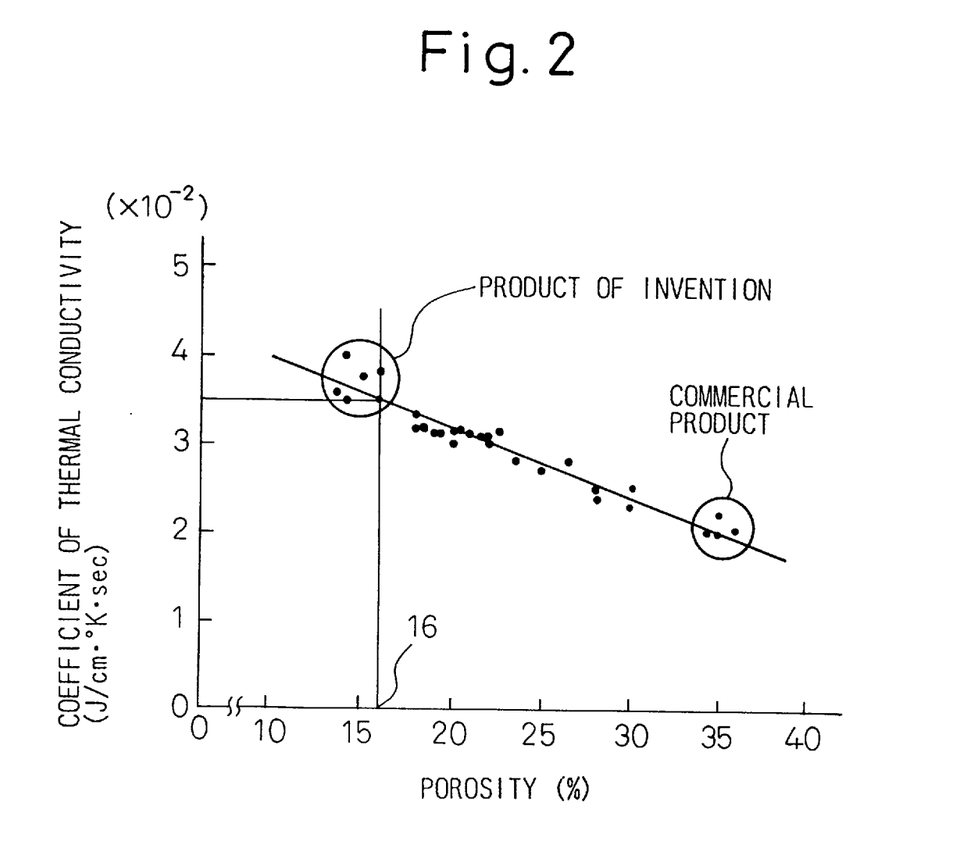
FIG. 2 is a diagram showing the correlation between the porosity of and the coefficient of thermal conductivity for a cordierite honeycomb structure prepared in Example 1.

When the porosity exceeds 16%, the coefficient of thermal conductivity becomes less than 0.035 J/cm·°K.·sec, making it impossible to ensure satisfactory thermal conductivity (see FIG. 2). Therefore, in order to provide a coefficient of thermal conductivity which can contribute to an improvement in conversion efficiencies, it is desired for the porosity to be not more than 16%.

Thus, according to a preferred embodiment of the present invention, there is provided a cordierite honeycomb structure, comprising as a main component a crystalline phase of cordierite, having a coefficient of thermal conductivity of not less than 0.035 J/cm·°K.·sec, a porosity of not more than 16%, and a coefficient of thermal expansion of not more than $1.0\times10^{-6}/°C$. at 40° to 800° C.

Preferably, the coefficient of thermal conductivity is 0.035 to 0.045 J/cm·°K.·sec, the porosity is 8 to 16% and the coefficient of thermal expansion at 40° to 800° C. is 0.4 to $1.0\times10^{-6}/°C$. The honeycomb structure having the above property values has further improved thermal conductivity and thermal shock resistance.

Further, the proportion of the crystalline phase of cordierite is preferably not less than 97%. This enables the low coefficient of thermal expansion to be ensured.

According to another aspect of the present invention, there is provided a process for producing a cordierite honeycomb structure, comprising the steps of: mixing powders of kaolin, talc, and other starting materials for cordierite together so as to provide a chemical composition of cordierite; extruding the mixture; and firing the extrudate, wherein the kaolin has an average particle diameter of not more than 5 $\mu$m and such a particle size distribution that the proportion of particles with diameters of less than 1 $\mu$m is not more than 10% (by weight; the same shall apply hereinafter) and the talc has an average particle diameter of not more than 10 $\mu$m and such a particle size distribution that the proportion of particles with diameters of less than 1 $\mu$m is not more than 5%.

In the production process according to the present invention, what is most important is that the kaolin used should an average particle diameter of not more than 5 $\mu$m and such a particle size distribution that the proportion of particles with diameters of less than 1 $\mu$m is not more than 10% and that the talc used should an average particle diameter of not more than 10 $\mu$m and such a particle size distribution that the proportion of particles with diameters of less than 1 $\mu$m is not more than 5%.

As described above, in order to ensure a high coefficient of thermal conductivity, the porosity should be not more than 16% (see FIG. 2). A mere decrease in porosity can be very easily realized by using as a flux a glass forming component such as $Na_2O$ or $CaO$. The use of the above glass forming component as the flux, however, unfavorably results in a remarkably increased coefficient of thermal expansion. As described above, this deteriorates the thermal shock resistance, rendering the honeycomb structure unsuitable for use as the carrier of converters for purifying exhaust gases.

The present inventors have found a method for bringing the porosity to not more than 16% without use of the above glass forming component. More specifically, they have succeeded in decreasing the porosity while ensuring the low coefficient of thermal expansion by regulating the particle diameter and particle size distribution of kaolin and talc as starting materials for forming a cordierite phase.

Size reduction of the starting materials is indispensable to the decrease in porosity of the cordierite honeycomb structure. An average particle diameter of kaolin exceeding 5 $\mu$m poses a problem of remarkably increased porosity. The same problem occurs when the average particle diameter of talc exceeds 10 $\mu$m. For this reason, the average particle diameters of kaolin and talc should be regulated so as to be not more than the above respective values.

Experiments, however, have revealed that mere size reduction has a limitation on decrease in porosity. Specifically, when the starting materials include a high proportion of particles with diameters of less than 1 $\mu$m, mere size reduction does not contribute to an increase in packing density of a formed body before firing to form cordierite. Therefore, the density of the final fired product cannot be satisfactorily improved, making it impossible to decrease the porosity.

The present inventors have found that, in starting materials, the regulation of the proportion of particles with diameters of less than 1 $\mu$m can improve the packing density, resulting in decreased porosity. Specifically, they have found that the porosity can be brought to as low as not more than 16% by regulating the kaolin so as to have such a particle size distribution that the proportion of particles with diameters of less than 1 $\mu$m in the kaolin is not more than 10% and, at the same time, regulating the talc to have such a particle size distribution that the proportion of particles with diameters of less than 1 $\mu$m in the talc is not more than 5%.

Figure 3:
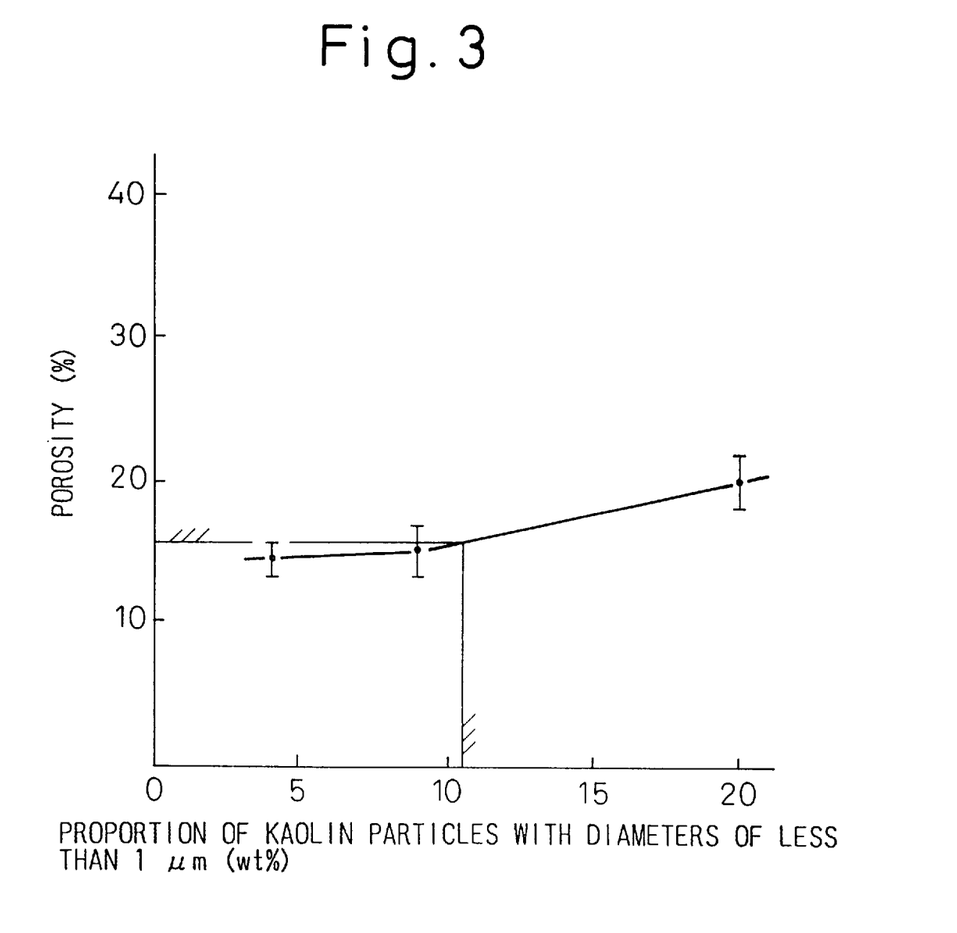
FIG. 3 is a diagram showing the correlation between the proportion of kaolin particles with diameters of less than 1 μm and the porosity for a cordierite honeycomb structure prepared in Example 1.

In this connection, it should be noted that even though the proportion of particles with diameters of less than 1 $\mu$m in the talc is not more than 5%, a rapid increase in porosity occurs when the proportion of particles with diameters of less than 1 $\mu$m in the kaolin exceeds 10% (see FIG. 3). Likewise, even though the proportion of particles with diameters of less than 1 $\mu$m in the kaolin is not more than 10%, a rapid increase in porosity occurs when the proportion of particles with diameters of less than 1 $\mu$m in the talc exceeds 5% (see FIG. 4). For this reason, for both kaolin and talc, the proportions of particles with diameters of less than 1 $\mu$m should be not more than the above values.

Further, it should be noted that, if the proportions of particles with diameters of less than 1 $\mu$m for kaolin and talc are excessively low, a cordierite having a satisfactorily low porosity cannot be provided.

That is, a cordierite having a satisfactorily low porosity can be provided only when the proportion of large particles and the proportion of small particles for each of kaolin and talc fall within respective optimal ranges.

This is because small particles enter among large particles, resulting in increased packing density of the whole particles.

The optical particle size distribution is specifically such that the kaolin has an average particle diameter of not more than 5 μm with the proportion of particles having diameters of less than 1 μm being 1 to 10% (by weight) and the talc has an average particle diameter of not more than 10 μm with the proportion of particles having diameters of less than 1 μm being 0.5 to 5% (by weight). This can provide a cordierite having a satisfactorily low porosity.

The second process for producing the above cordierite honeycomb structure comprises the steps of: mixing powders of kaolin, talc, and other starting materials for cordierite together so as to provide a chemical composition of cordierite; extruding the mixture; and firing the extrudate, wherein the extrusion is carried out through a die having a slit for forming a honeycomb structure and the ratio of the maximum particle diameter (R) of the raw material powder to the slit width (M) of the extrusion die, R/M, is not more than ⅓.

In the above production process according to the present invention, what is most important is that the ratio of the maximum particle diameter (R) of the raw material powder to the slit width (M) of the extrusion die, R/M, is not more than ⅓.

Figure 6A:
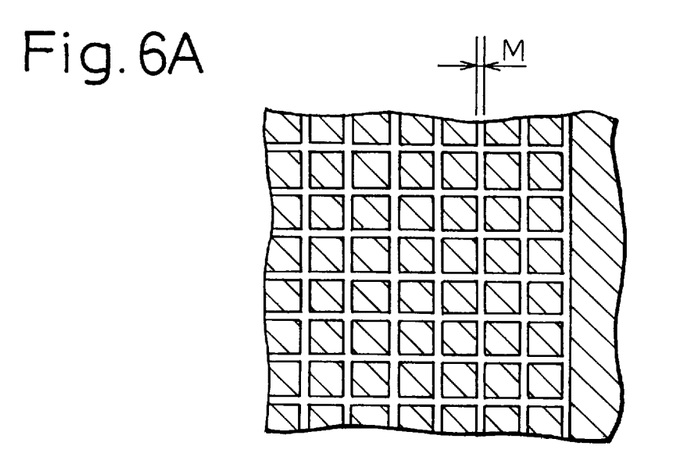
FIG. 6A is a cross sectional view of an extruding die for forming a honeycomb structure and FIG. 6B is a plan view of the die in FIG. 6A.
Figure 6B:
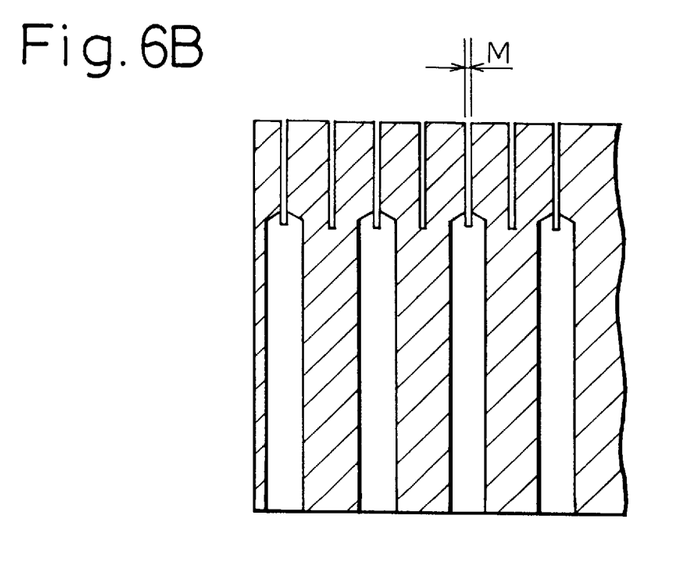

When R/M exceeds ⅓, the dropout of cells in the extruded body is increased (see FIG. 6). This is because when R/M exceeds ⅓, the possibility of the raw material particles clogging the slit of the extrusion die becomes high, resulting in dropout of cells corresponding to the clogged slit portions.

Figure 7:
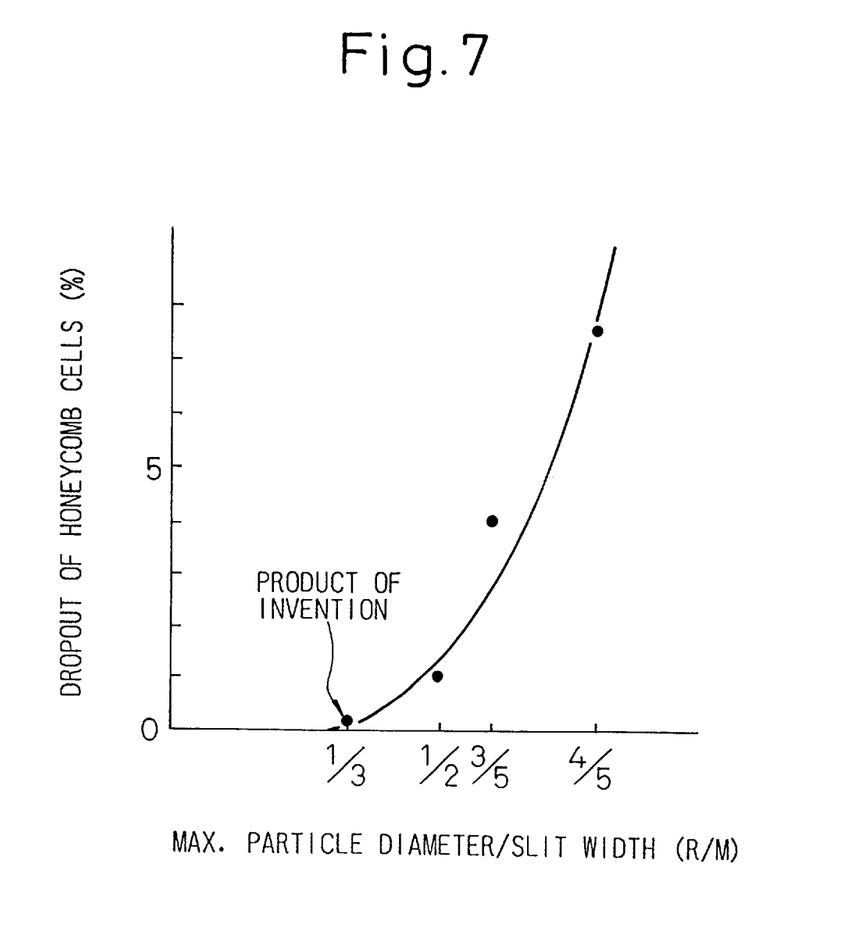
FIG. 7 is a diagram showing the correlation between the maximum particle diameter/slit width of extrusion die and the percentage dropout of honeycomb cells for a cordierite honeycomb structure prepared in Example 3.

FIG. 7 shows an embodiment of an extrusion die having a slit for forming a honeycomb structure. In the drawing, M represents the slit width of the extrusion die.

The cordierite honeycomb structure of the present invention has a coefficient of thermal conductivity of not less than 0.035 J/cm·°K·sec attributable to the porosity not more than 16%. By virtue of this, when the cordierite honeycomb structure is used as a catalyst carrier of converters for purifying exhaust gases, it exhibits a higher temperature rise rate of the catalyst than the conventional honeycomb structures, resulting in improved initial catalytic conversion efficiencies of the converters for purifying exhaust gases.

Further, since the coefficient of thermal expansion is not more than $1.0 \times 10^{-6}/°C$., the cordierite honeycomb structure has excellent thermal shock resistance and, hence, can withstand rapid temperature rise, rendering the cordierite honeycomb structure optimal for use as the catalyst carrier.

Further, according to the first production process of the present invention, the excellent cordierite honeycomb structure described above can be provided by regulating the particle diameters of kaolin and talc as starting materials for forming a cordierite phase to the above respective ranges.

Further, according to the second production process of the present invention, the diameter of all the starting material particles is not more than ⅓ of the slit width of the extrusion die, enabling a high-strength cordierite honeycomb structure free from dropout of cells to be provided.

As described above, the present invention can provide a cordierite honeycomb structure having a high coefficient of thermal conductivity and excellent thermal shock resistance.

EXAMPLES

Example 1

The cordierite honeycomb structure according to an example of the present invention and the process for producing the same, together with comparative examples, will now be described with reference to FIGS. 2 to 5.

The average particle diameter and the composition determined by chemical analysis for several materials, i.e., kaolin, talc, and alumina, used as starting materials for cordierite honeycomb structure are given in Table 1.

The mixing ratio of starting materials listed in Table 1, the proportion of particles with diameters of less than 1 μm, and various properties of sinters prepared using these starting materials, i.e., cordierite honeycomb structures (as describe below, part of the structures being not in a honeycomb form but a sheet form) are given in Tables 2 and 3.

The individual starting materials were regulated by pneumatic classification so as to have predetermined average particle diameters and particle size distributions. The measurements of the particle diameters and the particle size distributions were carried out with Sedigraph manufactured by Micromellitex.

The starting materials used had a ratio of a maximum diameter (R) to slit width (M) of a honeycomb extrusion die, i.e., R/M, of not more than ⅓, that is, a maximum particle diameter of not more than 43 μm.

In order to prepare the cordierite honeycomb structure, the starting materials listed in Table 1 are mixed together according to the formulation specified in Table 2 to prepare raw materials for ceramics. 5 parts by weight of methyl cellulose and water are added and kneaded with 100 parts by weight of the above raw materials for ceramics to prepare extrudable clays.

The clays are extruded by means of a screw extruder into honeycomb structures, and the extrudates are then dried and fired at 1450° C. for 5 hr, thereby preparing cordierite honeycomb structures formed of cordierite grains.

The cordierite honeycomb structures thus obtained have such a square cell structure that the cell wall thickness is 0.13 mm and the number of cells is 400 cells/inch$^2$. The geometry is such that the diameter is 103 mm and the height is 130 mm.

Samples having a predetermined dimension were taken off from the cordierite honeycomb structures and evaluated for the coefficient of thermal expansion and the porosity. The coefficient of thermal expansion was measured with a thermal dilatometer manufactured by Shinku-Riko Inc. The porosity was calculated from a pore volume measured with a porosimeter manufactured by Qantachrome.

The coefficient of thermal conductivity was measured as follows. Separately, clays having the above respective compositions were extruded through a slit die having a width of 0.5 mm into 0.5 mm-thick sheets. Then, the above procedure was repeated to prepare cordierite sinters in a sheet form. Samples were taken off from the sheets, and the coefficient of thermal conductivity was measured with a thermal constant measuring device manufactured by Shinku-Riko Inc.

Correlations among the various properties and the particle diameters of starting materials and the like of the cordierite honeycomb structures thus obtained will now be described with reference to FIGS. 2 to 4.

At the outset, the relationship between the porosity and the coefficient of thermal conductivity for the cordierite honeycomb structure is shown in FIG. 2. For comparison, the same evaluation was carried out on a conventional cordierite honeycomb structure used in a commercially available converter for purifying an exhaust gas. The results are shown in FIG. 2. As can be seen from FIG. 2, the product of the present invention having a porosity of not more than 16% had a coefficient of thermal conductivity of not less than 0.035 J/cm·°K.·sec which is higher than that of the conventional commercially available product.

Figure 4:
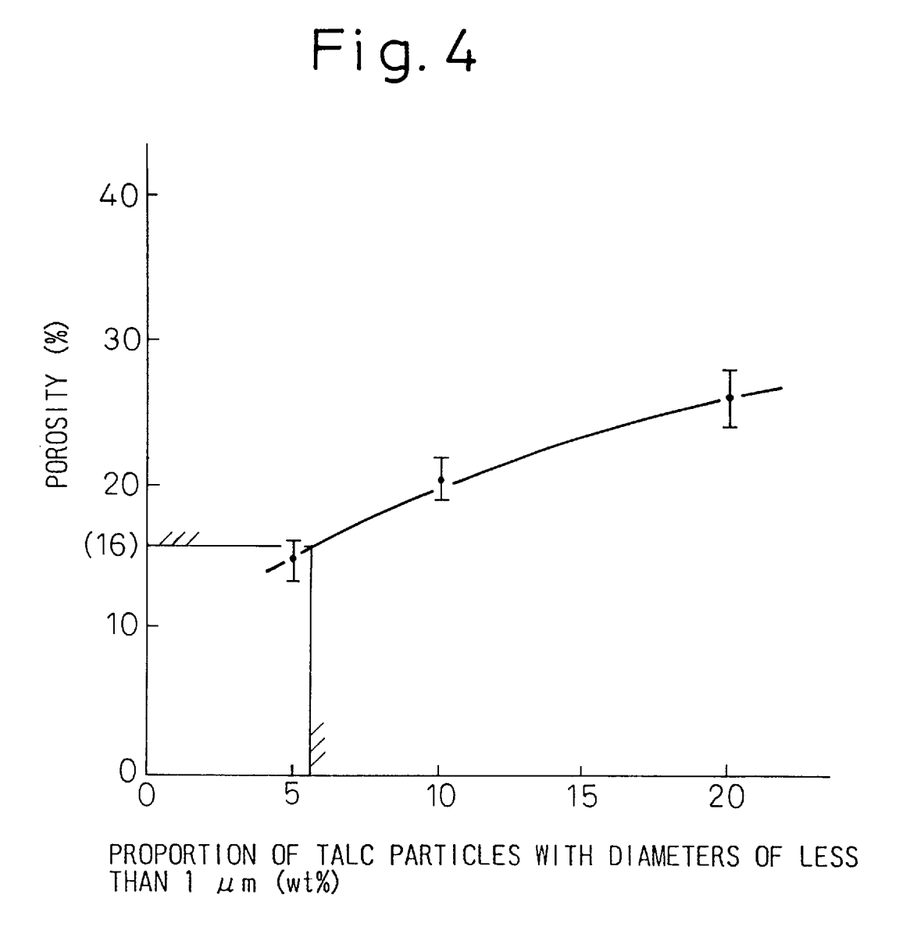
FIG. 4 is a diagram showing the correlation between the proportion of talc particles with diameters of less than 1 μm and the porosity for a cordierite honeycomb structure prepared in Example 1.

The relationship between the proportion of particles with diameters of less than 1 μm with respect to kaolin and talc and the porosity is shown in FIGS. 3 and 4. The results of comparative examples are also shown in FIGS. 3 and 4.

FIG. 3 shows the relationship between the proportion of kaolin particles with diameters of less than 1 μm and the porosity in the case where the average particle diameter and the proportion of particles with diameters of less than 1 μm for talc and the average particle diameter of kaolin have been regulated so as to fall within the respective ranges specified in the present invention. As can be seen from FIG. 3, the porosity can be regulated to not more than 16% by regulating the proportion of kaolin particles with diameters of less than 1 μm to not more than 10%.

FIG. 4 shows the relationship between the proportion of talc particles with diameters of less than 1 μm and the porosity in the case where the average particle diameter and the proportion of particles with diameters of less than 1 μm for kaolin and the average particle diameter of talc have been regulated so as to fall within the respective ranges specified in the present invention. As can be seen from FIG. 4, the porosity can be regulated to not more than 16% by regulating the proportion of talc particles with diameters of less than 1 μm to not more than 5%.

TABLE 1

| Material for ceramic | Avg. particle dia., μm | Ingredients | | | | | | |
|---|---|---|---|---|---|---|---|---|
| | | $SiO_2$ | $Al_2O_3$ | MgO | $TiO_2$ | $Fe_2O_3$ | CaO + $Na_2O$ + $K_2O$ | Ig-loss |
| Kaolin A | 5.2 | 44.9 | 38.9 | 0.2 | 0.8 | 0.2 | 0.3 | 14.3 |
| Kaolin B | 3.5 | 44.8 | 39.2 | 0.1 | 0.5 | 0.2 | 0.3 | 14.4 |
| Kaolin C | 2.0 | 45.3 | 38.4 | 0.3 | 1.4 | 0.3 | 0.4 | 14.0 |
| Kaolin D | 1.8 | 45.3 | 38.4 | 0.3 | 1.4 | 0.3 | 0.4 | 14.0 |
| Kaolin E | 1.5 | 45.3 | 38.4 | 0.3 | 1.4 | 0.3 | 0.4 | 14.0 |
| Talc A | 16.0 | 62.8 | 0.1 | 31.4 | — | 0.1 | 0.3 | 5.2 |
| Talc B | 6.0 | 62.1 | 0.1 | 30.5 | — | 1.0 | 0.4 | 5.5 |
| Talc C | 3.0 | 62.5 | 0.2 | 31.7 | — | 0.2 | 0.3 | 3.8 |
| Alumina A | 2.0 | — | 99.7 | — | — | — | 0.3 | 0.1 |
| Alumina B | 1.0 | — | 99.9 | — | — | — | — | 0.1 |
| Alumina C | 0.5 | — | 99.7 | — | — | — | — | 0.1 |

TABLE 2

| | Mixing ratio, wt % (symbol following numerical value:kind*1) | | | Proportion of particles with diameters of less than 1 μm (%) | | Properties of fired body | | | |
|---|---|---|---|---|---|---|---|---|---|
| | | | | | | Coefficient of thermal expansion, × $10^{-6}$ °C.$^{-1}$ | Porosity (%) | Coefficient of thermal conductivity, × $10^{-2}$ J/cm · °K. · sec | Remarks |
| No. | Kaolin | Talc | Alumina | Kaolin | Talc | | | | |
| 1 | 49.5;A | 37.0;A | 13.5;B | 3 | <1 | 0.68 | 30.0 | 2.3 | Comp. Ex. |
| 2 | 50.4;A | 36.5;C | 13.1;B | 3 | 30 | 0.90 | 22.5 | 3.2 | |
| 3 | 47.6;A | 38.3;B | 14.1;B | 3 | 5 | 0.77 | 23.5 | 2.8 | |
| 4 | 47.7;B | 38.4;B | 13.9;A | 6 | 5 | 0.65 | 16.0 | 3.6 | Inv. |
| 5 | 47.7;B | 38.4;B | 13.9;B | 6 | 5 | 0.72 | 15.0 | 3.5 | |
| 6 | 47.7;B | 38.4;B | 13.9;C | 6 | 5 | 0.53 | 15.0 | 3.65 | |
| 7 | 49.6;C | 36.8;A | 13.6;B | 4 | <1 | 0.60 | 20.0 | 3.2 | Comp. |

TABLE 2-continued

| | Mixing ratio, wt % (symbol following numerical value:kind*1) | | | Properties of fired body | | | | | |
|---|---|---|---|---|---|---|---|---|---|
| | | | | Proportion of particles with diameters of less than 1 μm (%) | | Coefficient of thermal expansion, × $10^{-6}$ °C.$^{-1}$ | Porosity (%) | Coefficient of thermal conductivity, × $10^{-2}$ J/cm · °K. · sec | Remarks |
| No. | Kaolin | Talc | Alumina | Kaolin | Talc | | | | |
| 8 | 50.3;C | 36.4;C | 13.3;B | 4 | 30 | 0.90 | 18.0 | 3.3 | Ex. |
| 9 | 47.5;C | 38.1;B | 14.4;A | 4 | 5 | 0.68 | 16.0 | 3.5 | Inv. |
| 10 | 47.5;C | 38.1;B | 14.4;B | 4 | 5 | 0.75 | 16.0 | 3.8 | |
| 11 | 47.5;C | 38.1;B | 14.4;C | 4 | 5 | 0.70 | 14.5 | 3.5 | |
| 12 | 49.6;D | 36.8;A | 13.6;B | 9 | <1 | 0.59 | 22.0 | 3.1 | Comp. |
| 13 | 50.3;D | 36.4;C | 13.3;B | 9 | 30 | 0.87 | 18.0 | 3.2 | Ex. |
| 14 | 47.5;D | 38.1;B | 14.4;A | 9 | 5 | 0.72 | 15.0 | 3.75 | |

*1) Symbol represents material for ceramic specified in Table 1.

TABLE 3

| | Mixing ratio, wt % (symbol following numerical value:kind*1) | | | Properties of fired body | | | | | |
|---|---|---|---|---|---|---|---|---|---|
| | | | | Proportion of particles with diameters of less than 1 μm (%) | | Coefficient of thermal expansion, × $10^{-6}$ °C.$^{-1}$ | Porosity (%) | Coefficient of thermal conductivity, × $10^{-2}$ J/cm · °K. · sec | Remarks |
| No. | Kaolin | Talc | Alumina | Kaolin | Talc | | | | |
| 15 | 47.5;D | 38.1;B | 14.4;B | 9 | 5 | 0.68 | 14.0 | 4.0 | Inv. |
| 16 | 47.5;D | 38.1;B | 14.4;C | 9 | 5 | 0.71 | 13.5 | 3.6 | |
| 17 | 49.6;E | 36.8;A | 13.6;B | 20 | <1 | 0.70 | 22.0 | 3.0 | Comp. |
| 18 | 50.3;E | 36.4;C | 13.3;B | 20 | 30 | 1.21 | 18.0 | 3.2 | Ex. |
| 19 | 47.5;E | 38.1;B | 14.4;A | 20 | 5 | 0.85 | 20.0 | 3.0 | |
| 20 | 47.5;E | 38.1;B | 14.4;B | 20 | 5 | 0.83 | 19.5 | 3.2 | |
| 21 | 47.5;E | 38.1;B | 14.4;C | 20 | 5 | 0.95 | 20.0 | 3.2 | |

*1) Symbol represents material for ceramic specified in Table 1.

Example 2

Converters using, as a carrier, cordierite honeycomb structure products of the present invention and commercially available cordierite honeycomb structure products as comparative examples were evaluated for initial conversion efficiencies.

The honeycomb structures of the present invention used were those prepared using raw material No. 6 specified in Table 2 of Example 1, and the comparative honeycomb structures used were those prepared using raw material No. 1 specified in Table 2 of Example 1.

The evaluation was carried out by mounting the converter for purifying an exhaust gas on a commercially available engine having a piston displacement of 2000 cc. The engine was started and held in an idled state, and an exhaust gas discharged from the engine was passed into the converter in a cold state. The purified gas was sampled at periodic intervals to measure the conversion of HC (hydrocarbons). The results are shown in FIGS. 5.

In the cordierite honeycomb structures of the present invention and the commercially available cordierite honeycomb structures used above, 100 g/L of γ-alumina was coated and fired, and 0.9 g/L of a noble metal catalyst composed of Pt and Rh was supported thereon.

As can be seen from FIG. 5, the converter using the product of the present invention can shorten by at least 10 sec the time taken for the conversion to reach 50% as compared with the converter using the commercially available product.

Example 3

FIG. 6A shows the cross section of a die for forming a shape of cordierite honeycomb structure and FIG. 6B shows the plan view of the die.

In general, a cordierite honeycomb structure is obtained by mixing particulate starting materials including kaolin, talc and others in such a composition to obtain cordierite, extruding the mixed material and firing the extruded material.

The die shown in FIGS. 7A and 7B is a typical die used for extruding the starting material to form a honeycomb structure. The mixed material is extruded in the direction from the bottom to the top of FIG. 6B so that the extruded honeycomb structure has a wall thickness corresponding to the slit width (M).

In Example 3, it is characterized that the ratio R/M, i.e., the ratio of the maximum particle size (R) of the particulate starting material to the slit width (M) of the shaping die, is ⅓ or less.

This example is shown in FIG. 7. FIG. 7 shows the relationship between the value determined by dividing the maximum particle diameter (R) of the raw material by the slit width (M) of an honeycomb extrusion die, i.e., R/M, and the dropout of honeycomb cells of the extruded honeycomb. The results of comparative examples are also shown in FIG. 7.

The slit width (M) of the honeycomb extrusion die is determined by (cell wall thickness)×[1+(drying shrinkage+firing shrinkage)/100].

As is apparent from FIG. 7, as described above, for the product of the present invention having an R/M of not more than $\frac{1}{3}$, the percentage dropout of honeycomb cells is very low and close to zero. On the other hand, for the conventional products having R/M of $\frac{1}{2}$, $\frac{3}{5}$, and $\frac{4}{5}$, the larger the R/M value, the higher the percentage dropout of honeycomb cells.

We claim:

1. A cordierite honeycomb structure comprising as a main component a crystalline phase of cordierite, said structure having a coefficient of thermal conductivity of not less than 0.035 J/cm·°K.·sec and a coefficient of thermal expansion of not more than $1.0 \times 10^{-6}$/°C. between 40° C. and 800° C.

2. The cordierite honeycomb structure according to claim 1, wherein the proportion of the crystalline phase of cordierite is not less than 97%.

3. A cordierite honeycomb structure comprising as a main component a crystalline phase of cordierite, said structure having a coefficient of thermal conductivity of not less than 0.035 J/cm·°K.·sec, a porosity of not more than 16%, and a coefficient of thermal expansion of not more than $1.0 \times 10^{-6}$/°C. between 40° C. and 800° C.

4. The cordierite honeycomb structure according to claim 3, wherein the proportion of the crystalline phase of cordierite is not less than 97%.

5. The cordierite honeycomb structure according to claim 3, wherein the coefficient of thermal conductivity is 0.035 to 0.045 J/cm·°K.·sec, the porosity is 8 to 16% and the coefficient of thermal expansion between 40° C. and 800° C. is 0.4 to $1.0 \times 10^{-6}$/°C.

6. The cordierite honeycomb structure according to claim 5, wherein the proportion of the crystalline phase of cordierite is not less than 97%.

\* \* \* \* \*

UNITED STATES PATENT AND TRADEMARK OFFICE
CERTIFICATE OF CORRECTION

PATENT NO. : 5,849,391
DATED : December 15, 1998
INVENTOR(S) : MIURA, et al.

It is certified that error appears in the above-identified patent and that said Letters Patent is hereby corrected as shown below:

On the Cover Page:

Reads: [73] Assignee: "Nippondenco Co."

Should read: [73] Assignee: --Nippondenso Co.--

Signed and Sealed this

Twenty-fourth Day of August, 1999

Attest:

Q. TODD DICKINSON

*Attesting Officer*            *Acting Commissioner of Patents and Trademarks*